Patented Aug. 3, 1926.

1,594,769

UNITED STATES PATENT OFFICE.

ALEX BROOKING DAVIS, OF CINCINNATI, OHIO, ASSIGNOR TO A. B. DICK COMPANY, OF CHICAGO, ILLINOIS, A CORPORATION OF ILLINOIS.

STENCIL SHEET.

No Drawing.     Application filed July 5, 1924. Serial No. 724,526.

The invention is particularly adapted for use in the production of stencil-sheets in which characters are produced by pressure, as by the impact of type and the like thereon. Such sheets are commonly formed of a porous base, such as yoshino, coated or impregnated with the type-impressible material. The present invention concerns such a coating or impregnating material and is based upon the discovery of the adaptability to the purpose stated of carbohydrate ethers suitably modified or tempered to make the resulting material readily and easily type-impressible without preliminary moistening, substantially insensible to atmospheric changes, durable and capable of producing a large number of copies. I do not claim broadly to be the first to produce carbohydrate ethers generally, for these, and various processes of making them, have long been known. For example, Lillienfeld (Patents Nos. 1,188,376 and 1,350,820) has heretofore disclosed processes for the production of the ethers of cellulose and of starch. Various other workers have also directed their efforts to the production of carbohydrate ethers of one sort or another and to perfecting the processes employed in such production. So far as I am aware, however, it has never been suggested that these processes or products could, by suitable modification, be advantageously employed in the stencil-duplicating field. I have found that such products are, as a rule, soluble in organic solvents, that the solutions may readily be mixed with various modifying agents and that mixtures so constituted, when applied to a suitable base, such as yoshino, form homogeneous bodies which are readily stencilizable, as by impact, for the production of copies. In the main, these ethers are water-insoluble; also insoluble in the materials commonly used in the production of duplicating inks— a very desirable factor, bearing as it does upon the characteristic of durability and quality of work. So far as I am aware, carbohydrates generally are suitable for the purpose herein described with, however, such variation in the degree of alkylation as may be found necessary to produce the best results. Among such carbohydrates I may mention, in addition to cellulose and starch, the sugars, certain gums such as dextrine, arabic, bassorin and pectins.

All evidence hitherto developed leads to the conclusion that carbohydrates and their derivatives, in which one or more hydroxyl groups have been converted to an ether by the replacement of one or more hydroxyl hydrogen atoms by an alkyl, aryl or aralkyl group will produce material having properties suitable for the manufacture of stencils. Also that many of the nitrogen containing carbohydrates, such as chitin, glucosamine and other amino sugars are applicable for this work. I do not restrict myself to the use of carbohydrates of only the so-called chain structure; the cyclic carbohydrates such as inosite, quercite and others are, in my belief, capable of being converted into ethers of similar character. Furthermore, many glucosides containing a carbohydrate molecule in combination are of a structure which should readily yield ethers upon substitution of hydroxyl hydrogen by one or more alkyl, aryl or aralkyl groups.

In practising my invention, the following detailed formula may be used:—100 grams of a high grade commercial cornstarch are dissolved in 900 cc. of a 10% solution of caustic soda. To this solution, there are then added 200 cc. of 30% caustic soda solution. The mass is now warmed on the water bath to a temperature of 40 to 60 degrees C., when there are added 200 cc. of diethyl sulphate. The mass is now heated one-half hour to two hours on the water bath to bring about a preliminary reaction, during which the mass to some extent thins out and becomes appreciably more fluid. During this reaction, the mass is constantly agitated to bring about thorough mixing of the diethyl sulphate with the solution. There are now added 500 to 600 grams of pulverized or flake caustic soda in solid form and this rapidly dissolves in the mass to form a homogeneous solution.

600 cc. of diethyl sulphate are now stirred into the mass, and under constant agitation it is heated on the water bath to a temperature of 85 to 95 degrees C. for a period of one to two hours, or until a reaction sets in, when the mass foams up sharply and the temperature spontaneously rises to approximately 120 degrees C. During this reaction, the starch is converted to an ether, one or more hydroxyl hydrogens being substituted by the ethyl group, and since the ether is insoluble in the supernatant liquor, it separates, first as a gummy or gelatinous mass, which quickly hardens. It is then removed from the liquor, disintegrated, washed with water and then with dilute sulphuric acid until entirely neutral. The mass is then dried, when it appears as an amorphous, nearly white, granular solid.

The carbohydrate (starch) ether produced as above described is now dissolved in ethyl acetate to make a 12½% solution. It dissolves readily in the cold. This solution, after being filtered to remove a small quantity of undissolved matter, is now ready for compounding for the manufacture of stencil-sheets.

To 100 cc. of 12½% starch ether solution in ethyl acetate, there are added 30 cc. of ethyl acetate. Into this mixture, there is poured a mass consisting, preferably, of 15 gm. of chlorinated naphthalene, 12 gm. of Japan wax, and 8 cc. of benzyl alcohol, these three products having previously been melted together until they form a homogeneous liquid. This mass is now placed in a suitable vessel and sheets of porous paper, such as yoshino, are drawn through or floated over the surface of the liquid, and hung up to permit the excess solvent to evaporate. The resulting sheet is now readily stencilizable and will produce large numbers of copies on a duplicating machine.

As an example of another carbohydrate ether which may advantageously be employed, I may point out that cellulose ether, made by treating hydrated cellulose with diethyl sulphate in a very similar manner or according to the processes described in Lillienfeld's patent above specified, produces excellent results when employed as follows:—The cellulose ether is dissolved in ethyl acetate to a 5% solution. 100 cc. of this 5% solution are diluted with 50 cc. of ethyl acetate. To this solution there are now added 15 gm. of chlorinated naphthalene, 10 gm. of Japan wax and 10 gm. of castor oil, these three products having previously been melted together to form a homogeneous solution. The resulting mass is now placed in a suitable vessel, and a porous sheet, such as yoshino, drawn through or floated over the surface of the solution, and hung up to dry, after which it may be stencilized in usual manner.

In carrying out the process, I do not restrict myself to the modifying and softening agents mentioned in these formulas, since many other products, such as resins, camphor, phenol ethers or various other wax-like substances and oils, may be added to the mass, and such substitution may be necessary, according to the character of carbohydrate ether used and the degree to which its hydroxyl hydrogen has been substituted. While I have worked primarily with the ethyl ethers of carbohydrates, the methyl or propyl ethers and probably many others may be entirely suitable for the purpose, and I therefore do not restrict myself to the kind of the ether.

The solvents, also, may be widely varied, since the carbohydrate ethers are soluble in other solvents than ethyl acetate. Owing to the chemical structure of the carbohydrates, it is obvious that isomeric ethers may be formed, depending upon the position at which the substituting groups enter the molecule, and such isomeric ethers may vary appreciably in properties one from the other, any of which may be applicable for this process.

The process of manufacturing the carbohydrate ethers by treatment with an alkyl sulphate may be replaced by treatment of the carbohydrates with an alkyl, aryl or aralkyl halogen derivative, and the particular group used in forming the ether and the variations in the temperature and pressure at which the ether is formed will no doubt yield carbohydrate ethers of varying properties as to solubility, viscosity of solution, homogeneity of film and freedom with which they may be incorporated with modifying agents, any one of which may be applicable for this purpose.

Cellulose ether solutions are readily miscible with the solutions of cellulose esters, such as the nitrate and acetate, and the incorporation of solutions of such esters, which are also capable of producing homogeneous films, will lead to combinations possessing desirable properties for this purpose.

What I claim is:—

1. A stencil-sheet having a base coated with a material including a carbohydrate ether.

2. A stencil-sheet having a base coated with a material including a carbohydrate ether and a tempering agent.

3. A stencil-sheet having a base coated with a material including a carbohydrate ether and a tempering agent as castor oil.

4. A stencil-sheet having a base coated with a material including a carbohydrate ether and a plasticizing agent as chlorinated naphthalene and the like.

5. A stencil-sheet coating solution including a carbohydrate ether and a volatile solvent thereof.

6. A stencil-sheet coating solution including a carbohydrate ether, a volatile solvent thereof and a tempering agent.

7. A stencil-sheet coating solution including a carbohydrate ether, a volatile solvent thereof, a tempering agent and a plasticizing agent.

8. A stencil-sheet coating solution including a carbohydrate ether, a volatile solvent thereof, a tempering agent and a waxy substance.

9. A stencil-sheet coating solution including a carbohydrate ether and a volatile solvent thereof, an oil and an alcohol.

10. A stencil-sheet coating solution including a carbohydrate ether and a volatile solvent thereof, an oil and a plasticizing agent.

11. A stencil-sheet coating solution including a carbohydrate ether and a volatile solvent thereof, an oil, an alcohol and a plasticizing agent.

12. A stencil-sheet having a base coated with a material including starch ether.

13. A stencil-sheet having a base coated with a material including starch ether and a tempering agent.

14. A stencil-sheet having a base coated with a material including starch ether, a tempering agent and a plasticizing agent.

15. A stencil-sheet having a base coated with a material including starch ether, a tempering agent, a plasticizing agent and a waxy substance.

16. A stencil-sheet having a base coated with a material including cellulose ether.

17. A stencil-sheet having a base coated with a material including cellulose ether and a tempering agent.

18. A stencil-sheet having a base coated with a material including cellulose ether, a tempering agent and a plasticizing agent.

19. A stencil-sheet having a base coated with a material including cellulose ether, a tempering agent, a plasticizing agent and a waxy substance.

This specification signed this 30th day of June, 1924.

ALEX BROOKING DAVIS.